United States Patent

[11] 3,611,831

| [72] | Inventor | Cormac Garrett O'Neill<br>Castro Valley, Calif. |
|---|---|---|
| [21] | Appl. No. | 881,714 |
| [22] | Filed | Dec. 3, 1969 |
| [45] | Patented | Oct. 12, 1971 |
| [73] | Assignee | Physics International Company<br>San Leandro, Calif. |

[54] TORSIONAL VIBRATION DAMPER
7 Claims, 6 Drawing Figs.

[52] U.S. Cl........................................ 74/574,
188/1 B, 310/8.7
[51] Int. Cl........................................ F16f 15/12
[50] Field of Search............................ 74/574;
188/1; 310/8.2, 8.7

[56] References Cited
UNITED STATES PATENTS

| 2,443,471 | 6/1948 | Mason | 188/1 B |
| 2,451,513 | 10/1948 | Salomon | 74/574 |

*Primary Examiner*—William F. O'Dea
*Assistant Examiner*—F. D. Shoemaker
*Attorneys*—Samuel Lindenberg and Arthur Freilich

ABSTRACT: Apparatus for damping the torsional oscillations of a rotating shaft, is provided which includes an electromechanical transducer coupled to said shaft for converting a substantial portion of the mechanical energy generated by the torsional oscillations of the shaft to electrical energy which can then be readily dissipated by applying it to load resistors.

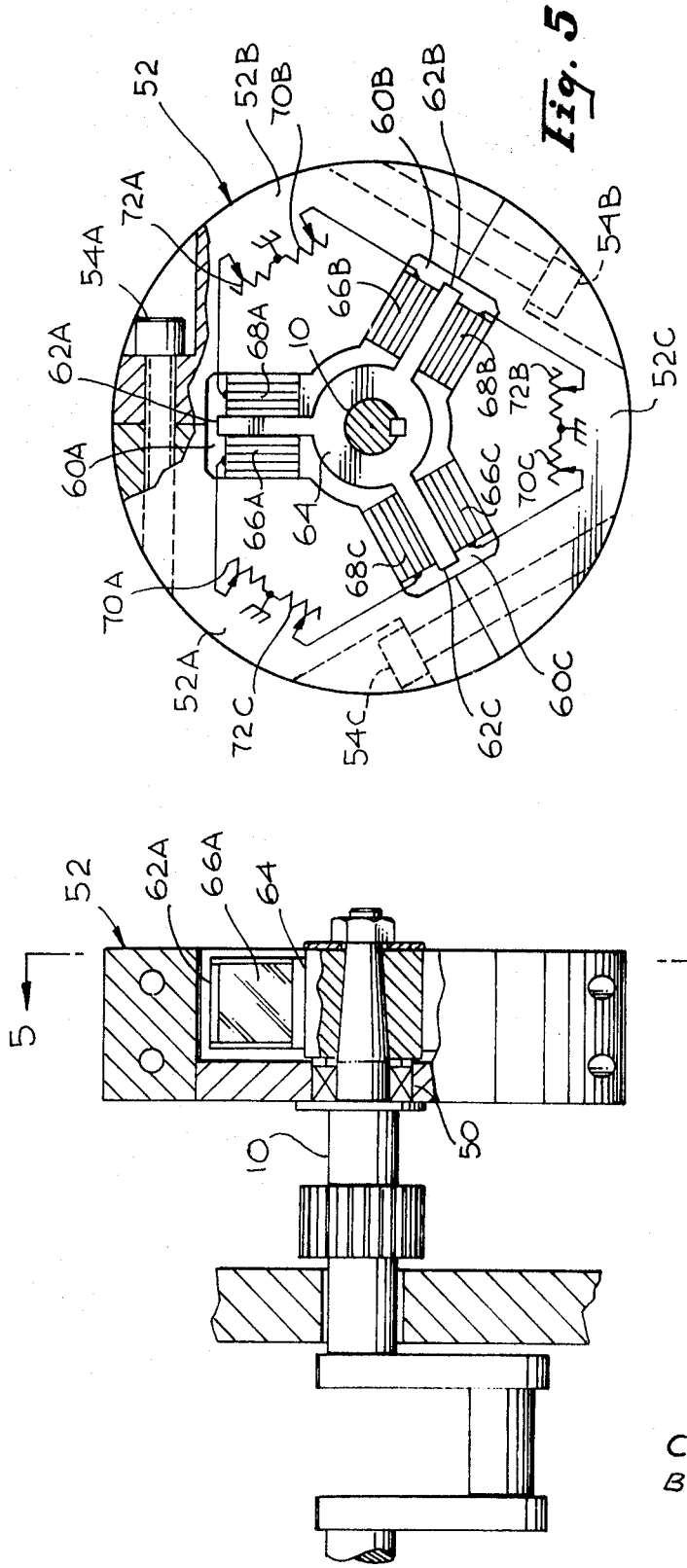
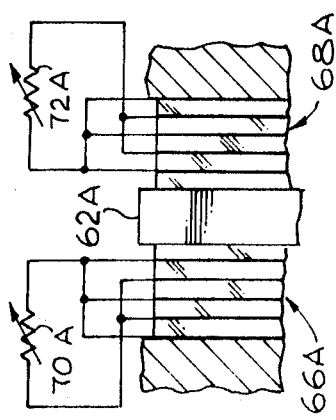
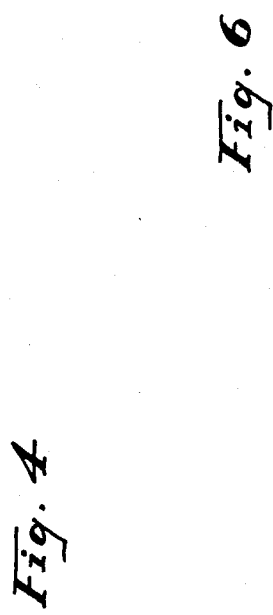

TORSIONAL VIBRATION DAMPER

BACKGROUND OF THE INVENTION

Rotating shafts which are driven from a "pulsing" energy source, such as the crankshaft in an automobile engine, are subject to torsional oscillation. In order to damp this oscillation, a number of approaches have been taken. One of these is to use rubber vibration dampers. It has been found however, that rubber dampers are limited in effectiveness and if run continuously at or near to their resonance vibration will fail.

Friction dampers have been effective only at certain speeds. It has been found further that these provide inconsistent damping over a range of speeds of the shaft. They usually are expensive and complicated to install.

Viscous dampers are expensive to manufacture and are ineffective in damping low-frequency harmonics. They also have the weakness that if run continuously at or near resonance, they tend to overheat and require air cooling to prevent deterioration.

OBJECTS AND SUMMARY OF THE INVENTION

An object of this invention is the provision of a vibration-damping structure for torsional oscillation of a rotating shaft which is equally effective over all speeds of that shaft.

Another object of this invention is the provision of a novel structure for damping the torsional oscillations of a rotating shaft, which is able to absorb large quantities of energy with small shaft vibration amplitudes and is substantially maintenance free.

Yet another object of this invention is the provision of an arrangement for damping torsional oscillations of rotating shafts which is inexpensive to manufacture and is simple to install.

The foregoing and other objects of the invention are achieved by the provision of a damper mass which is coupled to the rotating shaft by electroexpansive material such as piezoelectric material which acts as a spring. The piezoelectric material, when mechanically distorted either by compression or elongation forces converts a proportion of this energy to electrical energy. The electrical energy is dissipated by any suitable means such as resistors. To a certain extent the stiffness or resistance of the piezoelectric material to compression or tension forces may be determined by the value of the resistance across which the voltage that is generated by them is dissipated.

The novel features of the invention are set forth with particularity in the appended claims. The invention will be best understood from the following description when read in conjunction with the accompanying drawings.

BRIEF DESCRIPTION OF THE DRAWINGS

FIG. 4 is a view in section of an embodiment of the invention.

FIG. 5 is a view along the line 5—5 of FIG. 4.

FIG. 6 illustrates an arrangement for connecting a piezoelectric stack for dissipating energy, in accordance with this invention.

DESCRIPTION OF THE PREFERRED EMBODIMENTS

Figure 1:
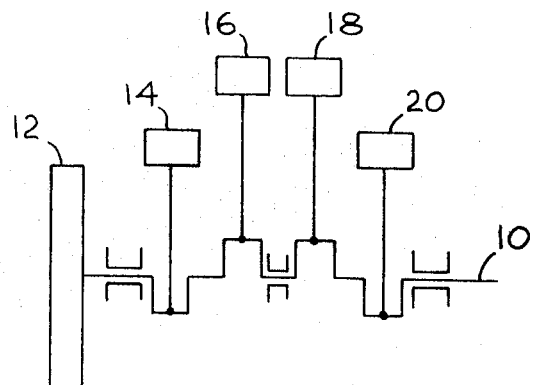
FIG. 1 is a schematic drawing of a crankshaft for a four cylinder engine, shown by way of illustration of a shaft which has undesirable torsional oscillations.

FIG. 1 is a schematic representation of a rotating shaft which is subject to undesirable torsional vibrations. It shows a crankshaft 10 which has a flywheel 12 at one end and is driven, by way of illustration, by four pistons 14, 16, 18 and 20.

Figure 2:
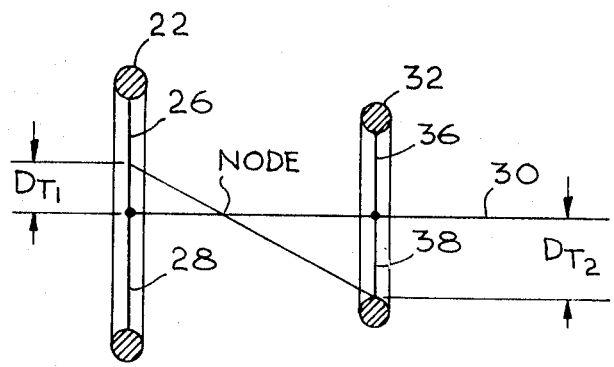
FIG. 2 represents an equivalent mass and angular displacement graph of a rotating shaft with torsional deflection.

FIG. 2 is a representation of the equivalent mass of the rotating system. The mass of the flywheel is represented by the annular mass 22, which is attached by arms 26, 28 to a central shaft 30. The mass of the crankshaft balance weights and rotating portions of the connecting rods is represented by the annular mass 32, which is attached by the arms 36, 38 to the central shaft 30.

The torsional deflection of the flywheel end of the crankshaft from a mean position is exemplified by the distance DT1. The torsional deflection of the timing gear end of the crankshaft from a means position is exemplified by the distance DT2.

Figure 3:
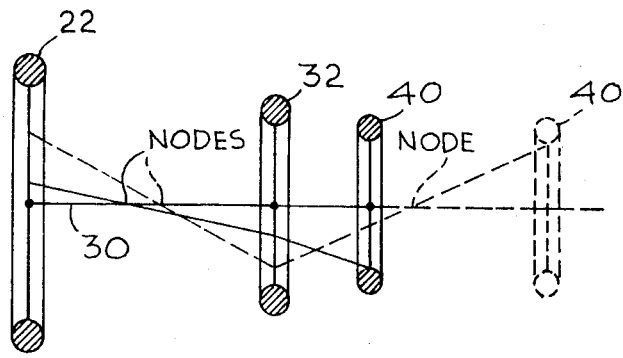
FIG. 3 represents an equivalent mass system and angular displacement graph when a damper is used.

FIG. 3 is an equivalent mass representation of the crankshaft 10, similar to the one shown in FIG. 2, but with an additional damping g mass added to the end of the shaft. An equivalent to the damping mass is represented by the annular mass 40. The torsional stiffness of the springs with which the damping mass is coupled to the crankshaft determines the position of the mass in the equivalent system. The more flexible the springs, the farther out the damping mass is effectively coupled to the shaft 30. A more flexible coupling system is represented by the dotted lines.

The addition of rotating mass to the end of the crankshaft, remote from the flywheel, has the effect of lowering the natural frequency of the one-node mode of vibration. If the mounting of the damping mass is torsionally flexible, then the vibration mode will be as shown by the dotted lines in FIG. 3. This invention, by the use of a torsionally flexible mounting incorporating piezoelectric energy absorbers has the effect of moving the damping mass farther out on the shaft as represented by the dotted lines. Transfer of kinetic energy from the rotating mass 40 to strain energy in the shaft occurs through the piezoelectric element where approximately one-half the energy is converted to electrical energy and one-half appears as strain energy in the ceramic. The energy that is converted to electrical energy may be dissipated in a resistor and this quantity of energy may be extracted from the system on each half cycle of vibration.

Reference is now made to FIG. 4 which shows in cross section a torsional vibration damping arrangement in accordance with this invention, and FIG. 5 which is a view in section taken along he lines 5—5 of FIG. 4.

The end of the crankshaft 10 has seated thereon a bearing 50, on which there is rotatably mounted a damper body 52. As may be seen in FIG. 5, the damper body has a circular configuration. It actually consists of three arcuate sections 52A, 52B, and 52C, which are assembled by inserting bolts 54A, 54B, and 54C into holes which are positioned at the outer ends of the respective arcuate sections.

The arcuate sections are provided with abutting cutout sections at their central edge surfaces which, when the damper body is assembled form radially extending cavities respectively 60A, 60B, and 60C. Into these cavities extend blades respectively 62A, 62B, and 62C. These blades are mounted on and integral with a hub 64. The hub is keyed onto the shaft to be rotatable therewith and also serves to rotate the blades.

The thickness of a blade is made less than the dimensions of each cavity formed within the damper mass to enable the insertion, between blade and the walls forming the cavity adjacent the blade, of electrostrictive or piezoelectric material, respectively 66A, 68A, 66B, 68B and 66C, 68C. The well-known property of this material is that it generates an electrical signal when it is mechanically deformed, and, when an electrical signal is applied thereacross, it mechanically deforms.

FIG. 6 shows an enlarged section of the arrangement just described. Extending from either side of the blade 62A is piezoelectric material respectively 66A, 68A, which is in the form of a stack of disks of the material. In well-known fashion, the top and bottom surfaces of the disks are made conductive and these respective opposite conductive surfaces are connected together and across a variable resistor respectively 70A, 72A. The damper body is positioned by the rotating shaft through the bearing 50 and torsionally coupled through the piezoelectric stacks, which act as coupling springs.

In operation, the rotating shaft 10 causes the camper mass to rotate. The damper mass, because of its inertia, attempts to continue its rotation at a uniform rotational velocity However, because of the torsional vibration of the shaft, there is an additional oscillation whereby the blades 62A, 62B and 62C attempt to speed up and/or slow down the rotating mass thereby applying pressure alternately to the piezoelectric stacks 66A, 66B, 66C and 68A, 68B, 68C.

The pressures on the piezoelectric material result in the generation of voltages which cause current flow through the resistors 70A and 72A as well as the other resistors employed with the invention as shown in FIG. 5. Thereby, the torsional vibration energy that is converted to electrical energy (which represents about 50 percent of the total energy transferred) may be converted to heat energy and dissipated. The remaining energy of the torsional vibration is accepted by the piezoceramic as strain energy and then is reconverted to kinetic energy of the damper mass.

Since, to a certain degree, the elastic compression or deformation of the piezoelectric material can be controlled by the electrical loading applied thereto, it is within the scope of this invention to load the piezoelectric stacks so that they effectively act as stiffer springs.

Also, from a knowledge of the frequency at which the worst torsional vibration amplitudes occur, the value of the damping resistors may be optimized to ensure complete energy absorption in the time available. The lower the resistance value the more quickly the electrical energy generated in the piezoelectric material is dissipated.

The resistors may be located on the exterior of the damper body as may be seen in FIG. 5 whereby they may be cooled more readily. However, this should not be construed as s limitation, if it is desired to locate the resistors where rapid and easy adjustment of them is desired, then the voltages generated by the piezoelectric resistors may be taken from the rotating mass by means of brushes and slip rings which are connected to the resistors. They may then be positioned at any convenient location.

While the invention has been described as suitable for application to the crankshaft of a motor vehicle, it will be appreciated that this is merely by way of illustration of the invention and should not be construed as a limitation thereon. This invention may be applied to any rotating shaft which has a problem of torsional vibration which it is wished to minimize.

What is claimed is:

1. Apparatus for damping the torsional vibration of a rotating shaft comprising piezoelectric means;
   means mounted on said shaft and rotatable therewith, for applying pressures derived from vibration amplitude to said piezoelectric means whereby said piezoelectric means generates change in response thereto; and
   means for dissipating the electrical energy generated in said piezoelectric means.

2. Apparatus for damping the torsional vibrations of a rotating shaft comprising a damper mass;
   means for rotatably supporting said damper mass at one end of said shaft;
   piezoelectric means;
   means coupled to said shaft to be rotatable therewith for applying energy from said shaft to said damper mass through said piezoelectric means whereby said piezoelectric means generates electrical energy responsive thereto; and
   means for dissipating the electrical energy generated by said piezoelectric means.

3. Apparatus as recited in claim 2 wherein said means for applying energy from said shaft to said damper mass through said piezoelectric means comprises radially extending blade means, hub means attached to said shaft and supporting said blade;
   said damper mass having a radial cavity therein into which said blade means extends;
   said piezoelectric means being disposed on either side of said blade means between it and the walls of said damper mass which forms said cavity.

4. Apparatus for damping the torsional vibrations of a rotating shaft comprising a damper mass rotatably mounted on said shaft; and
   means for applying rotational energy from said shaft to said damper mass including:
   blade means mounted on said shaft to be rotatably driven thereby, piezoelectric means mounted between said blade means and said rotatable mass for applying rotational energy to said damper mass through said piezoelectric means whereby said piezoelectric means develops voltages in response thereto; and
   means for dissipating the electrical energy generated by said piezoelectric means.

5. Apparatus as recited in claim 4 wherein said means for dissipating the electrical energy generated by said piezoelectric means includes resistance means connected to said piezoelectric means.

6. Apparatus as recited in claim 4 wherein said damper mass comprises a cylindrical body having a central cavity through which said rotating shaft extends and at least one radial cavity extending from said central cavity; and
   means for rotatably mounting said damper mass on said rotating shaft.

7. Apparatus as recited in claim 6 wherein said blade means extends into said damper mass radial cavity; and
   said piezoelectric means is between said blade means and walls forming said damper mass radial cavity.